United States Patent [19]

Kaneko

[11] Patent Number: 5,490,321

[45] Date of Patent: Feb. 13, 1996

[54] APPARATUS AND METHOD FOR REMOVING A STOPPER

[75] Inventor: Hiroyuki Kaneko, Tokyo, Japan

[73] Assignee: Olympus Optical Co., Ltd., Tokyo, Japan

[21] Appl. No.: 232,684

[22] Filed: Apr. 25, 1994

[30] Foreign Application Priority Data

May 11, 1993 [JP] Japan .................................. 5-109393

[51] Int. Cl.⁶ .................................................. B23P 17/00
[52] U.S. Cl. ........................ 29/714; 29/235; 29/426.5; 29/709
[58] Field of Search .............................. 29/426.5, 235, 29/707, 709, 714, 801

[56] References Cited

U.S. PATENT DOCUMENTS 4,068,798  1/1978  Rohde ........................ 29/426.5
4,982,553  1/1991  Itoh ........................... 29/235 X

FOREIGN PATENT DOCUMENTS 1-263558  10/1989  Japan .
2-128949  10/1990  Japan .

Primary Examiner—S. Thomas Hughes
Attorney, Agent, or Firm—Frishauf, Holtz, Goodman, Langer & Chick

[57] ABSTRACT

An apparatus and method are provided for removing a stopper from a material holding container. A container holder is provided for immovably holding a stopper-fitted material holding container in place. While the material holding container is held by the container holder, the fitted stopper is grasped by claw members. The grasping claw members are driven by a linear drive source and swinging motion drive source. The fitted stopper is removed from the material holding container, while applying a pull-up force and twist force to the fitted stopper.

15 Claims, 5 Drawing Sheets

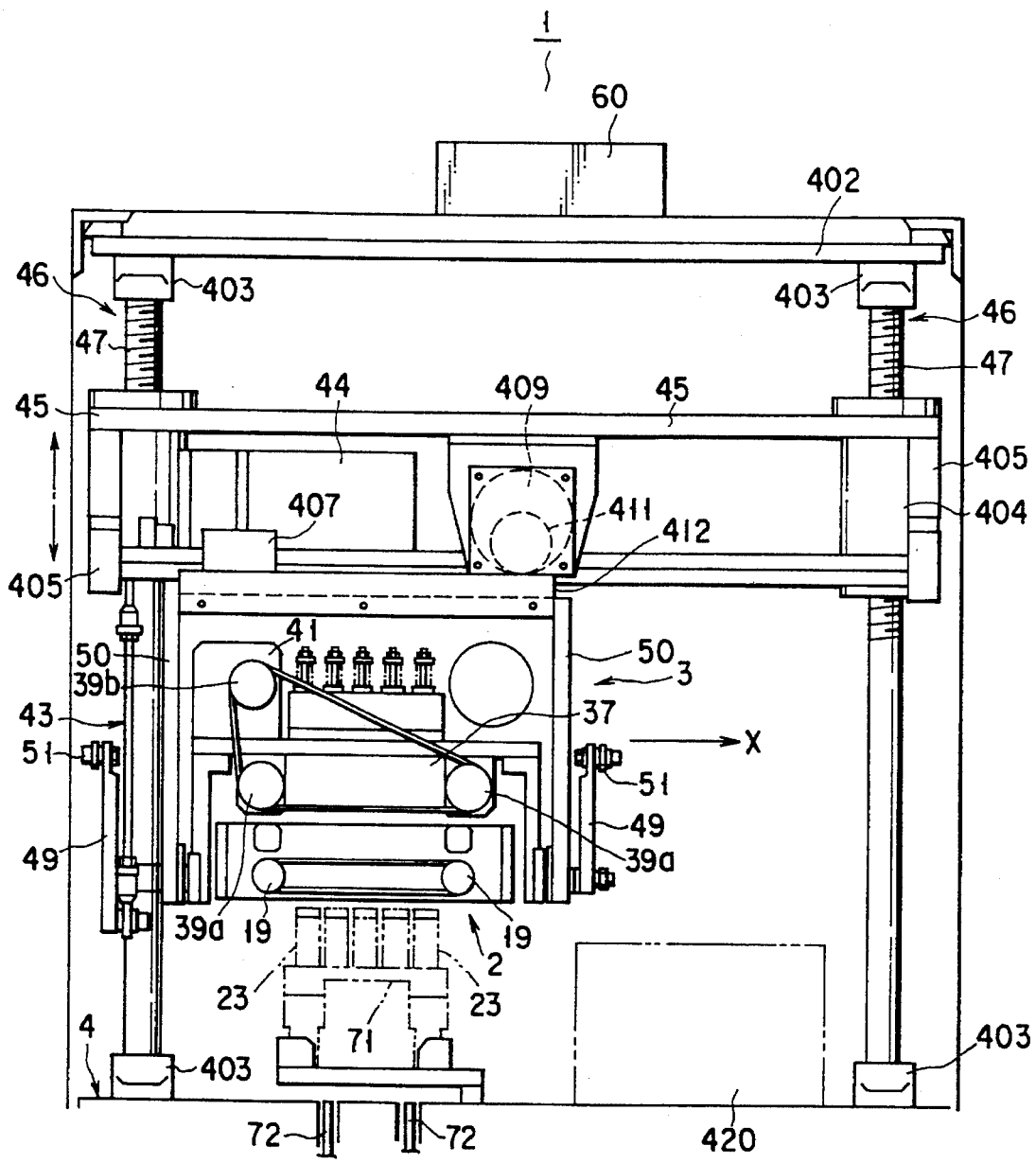
F I G. 2

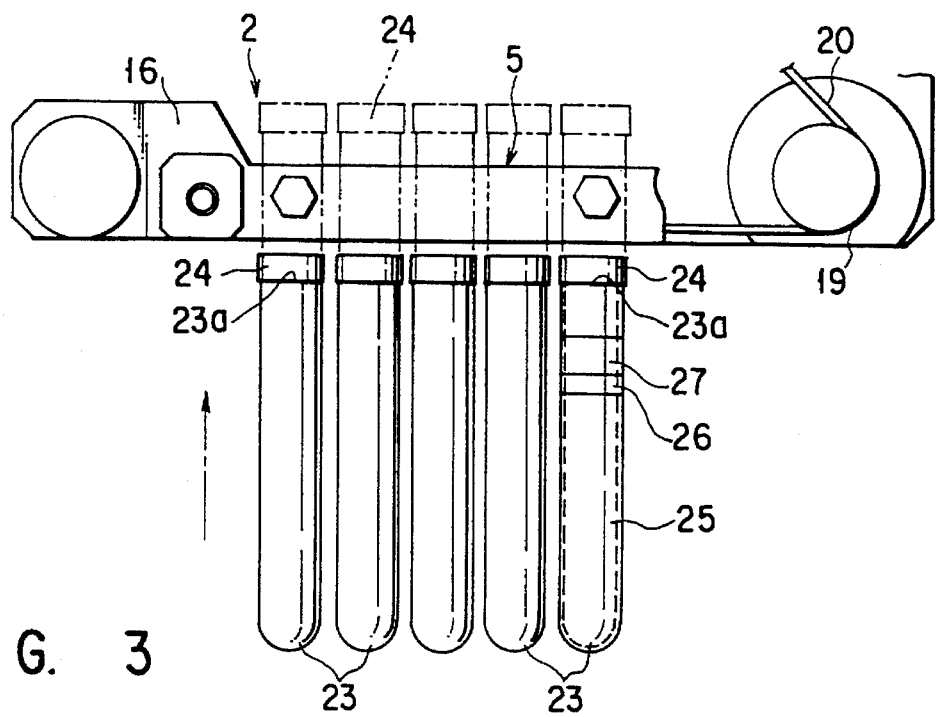
F I G. 3
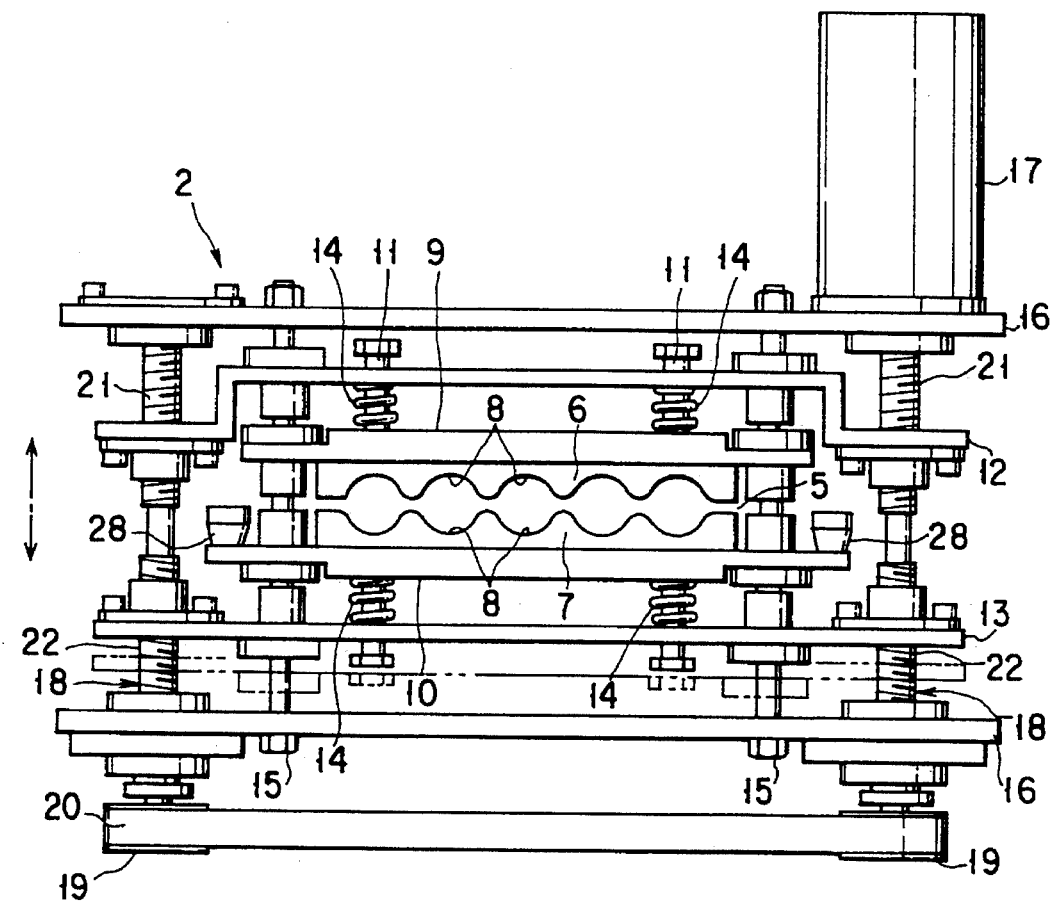
F I G. 4

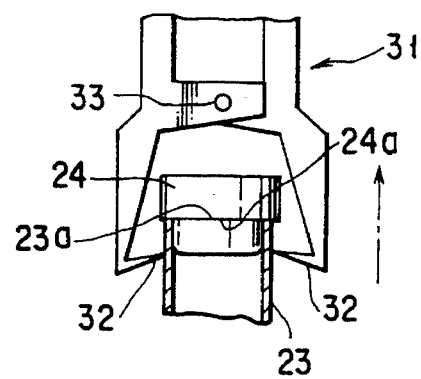
F I G. 6A
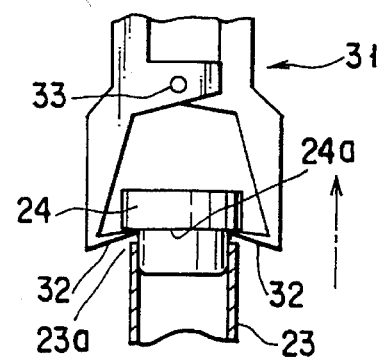
F I G. 6B
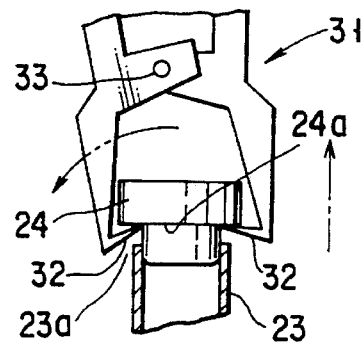
F I G. 6C
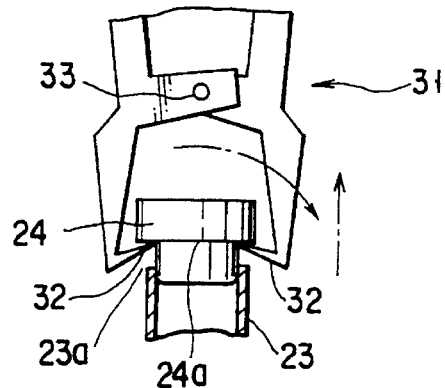
F I G. 6D

APPARATUS AND METHOD FOR REMOVING A STOPPER

BACKGROUND OF THE INVENTION

1. Field of the Invention

The present invention relates to a stopper removing apparatus for automatically removing a sealing stopper from, for example, a blood sample tube and test tube.

2. Description of the Related Art

In a clinical assay field, for example, a glass type vacuum blood sample tube has been generally extensively used as a means for holding a material to be examined. For the vacuum blood sample tube, a sealing stopper, such as a rubber stopper, is used so as to maintain an interior vacuum level of the blood sample test tube stable and constant for an extended period of time. After the sampling of the blood, the material is subjected to the action of a centrifuge and transferred to an analytical unit, but, prior to taking up the material from the blood sample tube, a fitted stopper is removed from the blood sample tube. Conventionally, the removal of the stopper has been achieved by manually applying a twist force to the stopper or through the utilization of a twist-applying unit.

An automatic stopper removing device is disclosed, for example, in JPN PAT APPLN KOKAI Publication 1-263558, JPN UM APPLN KOKAI Publication 2-128949, etc. In the former Publication, the stopper is removed from the tube by applying a twist force to the stopper, while in the latter Publication, the stopper is removed from the tube by applying an upwardly oblique pull-up force to the stopper.

As set out above, the sealing stopper is conventionally removed from the vacuum blood sample tube, etc., by applying an external force to the stopper by the manual operation of the operator or applying a twist force to the stopper by the twist applying unit.

Such a stopper is firmly forced into the vacuum blood sample tube and an adequately strong force is required to remove the stopper from the tube. If there is no adequate ingenuity in properly removing the stopper from the tube, then there is risk that the blood sample tube will be broken or that a material in the tube will be scattered abruptly upon sudden removal of the stopper from the tube.

In the case where, in particular, the stopper is removed from the tube by the manual operation of the operator, there is, sometimes, a risk that the operator will receive a wound when the tube is scattered to fragments or that the scattered fragments will hit against the wound. Among those materials held in the tubes, some is contaminated with a highly infection virus, for example, in hepatitis and AIDS, and the operator has high risk of being infected with some diseases. In a blood assay, it is desirable to use an automatic stopper removing device for always automatically removing a sealing stopper from the tube without the operator's manual intervention.

If any scattered fragments from one blood sample tube enter into another, contamination is produced from the fragments and there is sometimes a case where no correct assay can be conducted on a blood analysis apparatus. Therefore, the stopper removing operation may affect the reliability with which blood is analyzed.

SUMMARY OF THE INVENTION

The object of the present invention is to provide a apparatus and method for automatically removing a stopper from a material holding container without any risk of involving a breakage of the material holding container or scattering of the material held in the container.

According to one aspect of the present invention there is provided a stopper removing device for removing a stopper from a material holding container, comprising:

container holding means for immovably holding the material holding container in place;

grasping means for grasping the sealing stopper sealingly fitted in the material holding container held in the container holding means;

linear drive means for linearly moving the grasping means and for applying a pull-up force to the sealing stopper; and swinging motion drive means for swinging the grasping means and for applying a twist force to the sealing stopper.

According to another aspect of the present invention a stopper removing device is provided for removing a sealing stopper fitted in a material holding container, comprising:

a device body;

container holding means, provided on the device body, for immovably holding the material holding container in place;

an up/down movable base movable in an up/down direction over the container holding means;

grasping means, swingably attached by a link mechanism to the up/down movable base, for grasping the sealing stopper;

linear drive means for driving the up/down movable base in an upward direction with the sealing stopper grasped by the grasping means and for applying a pull-up force to the sealing stopper; and swinging motion drive means for swinging the grasping means with the sealing stopper grasped by the grasping means and for applying a twist force to the sealing stopper.

According to another aspect of the present invention a stopper removing device is provided for removing a sealing stopper fitted in a material holding container, comprising:

container holding means for immovably holding the material holding container in place;

grasping means for grasping the sealing stopper fitted in the material holding container held by the container holding means in place;

linear drive means for linearly moving the grasping means and for applying a pull-up force to the sealing stopper;

swinging motion drive means for swinging the grasping means and for applying a twist force to the sealing stopper;

detecting means, located at a height level substantially same as that at which the sealing stopper of the material holding container is situated, for detecting whether or not the sealing stopper is removed from the material holding container; and control means for repeatedly applying a pull-up force and twist force to the sealing stopper by a signal produced when the detecting means detects that the sealing stopper is not removed from the material holding container.

According to another aspect of the present invention, there is provided a method for removing a sealing stopper fitted in a material holding container, comprising the steps of:

immovably holding the material holding container with their stopper-fitted sides up;

grasping the stopper fitted in the material holding container held immovably; and applying a pull-up force and twist force to the grasped stopper.

According to another aspect of the present invention there is provided a method for removing a sealing stopper fitted in a material holding container, comprising the steps of:

immovably holding the material holding container in place;

grasping such sealing stoppers fitted in the material holding container immovably held in place;

applying a pull-up force and twist force to the grasped stopper and removing the stopper from the material holding container; and conveying the removed stoppers to a predetermined position while maintaining the removed stopper in a grasped state.

According to the apparatus and method as set out above, the sealing stopper can be automatically removed from the material holding container without involving a breakage of the container or scattering of the material held in the container.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a side view showing the device of FIG. 1;

FIG. 3 is a side view showing a blood sample tube clamping unit in FIG. 1;

FIG. 4 is a plan view showing the blood sample tube clamping unit;

FIG. 6A is one stopper removing step according to the present method;

FIG. 6B is another stopper removing step;

FIG. 6C is another stopper removing step; and

FIG. 6D is another stopper removing step.

DETAILED DESCRIPTION OF THE PREFERRED EMBODIMENT

One embodiment of the present invention will be explained below with reference to the accompanying drawings.

Figure 1:
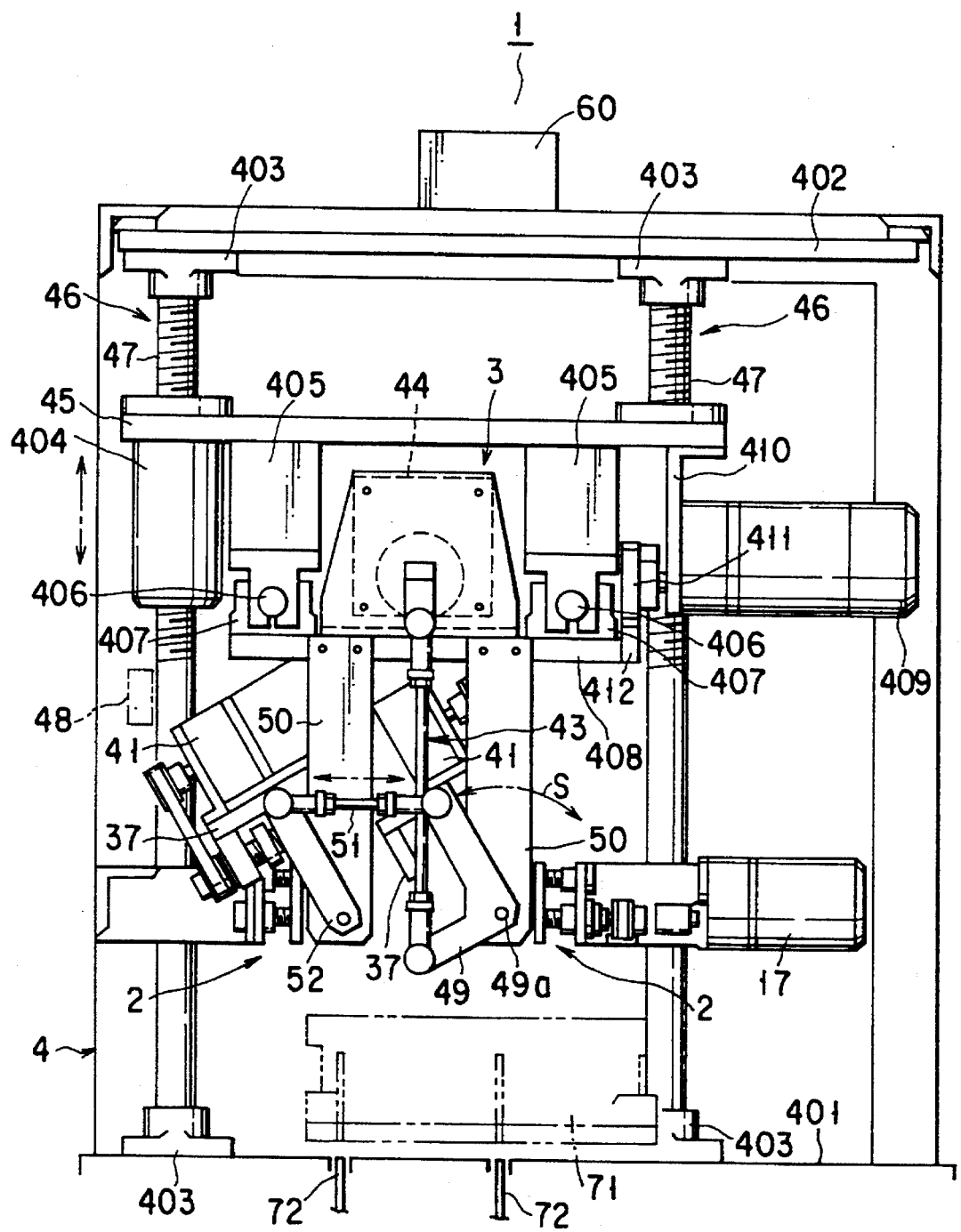
FIG. 1 is a front view showing a stopper removing device according to one embodiment of the present invention.

FIGS. 1 to 6D show one embodiment of the present invention. Reference numeral 1 in FIGS. 1 and 2 shows a stopper removing device. The stopper removing device 1 includes two sets of blood sample tube clamping units 2 and stopper removing units 3, the blood sample tube clamping unit 2 serving as a tube retaining means.

The stopper removing device 1 comprises a device body 4 which, as shown in FIGS. 1 and 2, has a base 401 and top plate 402 situated over the base 401. Four bearings 403 are so provided as to correspond to the base 401 and top plate 402. Four guide shafts 46 have their upper and lower end portions rotatably supported in the corresponding upper and lower bearings 403. Put it in another way, the four guide shafts 46 are situated at each corner portion of a rectangular structure.

A threaded portion 47 is provided at the upper portion of the guide shaft 46 with a movable cylinder 404 threadably fitted over the threaded portion 47. An up/down movable base 45 is mounted on the four movable cylinders 404. A pair of brackets 405 are provided on both longitudinal end portions of the lower surface of the up/down movable base 45 such that they hang down there.

A guide shaft 406 has their end portions held by a respective pair of brackets 405 so as to correspond to the width direction of the up/down movable base 45. A pair of slider members 407 are slidably mounted over the respective guide shafts 406. The four slider members 407 are fixed to the upper surface of a horizontal movable base 408.

The horizontal movable base 408 is driven along the guide shaft 406 by a horizontal moving source 409 equipped with a motor speed reducing unit as an integrated unit. The horizontal motion drive source 409 is mounted by an L-shaped bracket 410 to the up/down movable base 45 as shown in FIG. 1 and situated at the width-direction one-end side of the horizontal moving base 408.

A pinion 411 is mounted on the output shaft of the horizontal motion drive source 409. The pinion 411 is provided in mesh with a rack 412 provided on the width-direction one-end side of the horizontal moving base 408 when the pinion 412 is rotated by the horizontal motion drive source 409, the horizontal moving base 408 is driven along the longitudinal direction of the device body 4.

A pair of support plates 50 are provided at each longitudinal end of the horizontal moving base 408 such that they hang down from there. The stopper removing unit 3 is provided, as will be set out below, at the paired support plates 50 corresponding to the width-direction of the horizontal moving base 408. That is, the paired stopper removing units 3 are mounted, in a parallel array, along the width direction of the device body 4.

A pair of blood sample tube clamping units 2 are provided below the paired stopper removing units 3 and fixed to the device unit 4 as shown in FIG. 1. The blood sample tube clamping unit 2 includes a clamping to holder 5 as shown in FIGS. 3 and 4. The clamping holder 5 is comprised of two clamps 6 and 7 made of an elastic material such as rubber and synthetic resin.

The clamps 6 and 7 are provided in an arcuately wavy pattern with a plurality of (here, five) arcuate recesses provided in a mutually confronting relation. The clamps 6 and 7 are fixed to the corresponding supports 9, 10 by a means, such as bonding.

Supports 9, 10 are coupled by first guide rods 11 to slide members 12, 13 and linearly displaced along the guide rods 11. Further, a coil spring 14 is mounted around the guide rods 11 so that a spacing between the support (9, 10) and the slide member (12, 13) is elastically provided.

The slide members 12 and 13 are coupled by second guide rods 15 to a clamping body 16 and the second guide rods 15 extend through the supports 9, 10 and slide members 12, 13. The supports 9, 10 and slider members 12, 13 are linearly displaced along the second guide rods 15.

The clamping body 16 is mounted on the device body 4, that is, the blood sample tube clamping unit 2 is located in a predetermined position of the device body 4. A clamp open/close motor 17 and paired power transmission rods 18 are mounted on the clamping body 16. One end of one power transmission rod 18 is coupled to the clamp open/close motor 17.

Pulleys 19 are mounted on the other-end sides of the respective power transmission rods 18 and a timing belt 20 is wrapped around the paired pulleys 19. Two threaded portions 21 and 22 are provided in mutually reverse directions and the slide members 12 and 13 are threaded over the threaded portions 21 and 22.

The power transmission rod 18 is rotated by the clamp open/close motor 17. With the rotation of the respective rods 18, the slide members 12, 13 are moved along the threaded portions 21, 22. The respective slide members 12, 13 displace the clamps 6, 7 as one unit. The clamp open/close motor 17 is rotatable in normal and reverse directions and, in accordance with the rotation direction, the clamps 6 and 7 are horizontally moved toward or away from each other.

When the clamps 6, 7 are driven in a direction toward each other, blood sample tubes 23 serving as material holding container are clamped in a non-movable state.

The respective blood sample tubes 23 handled by the present embodiment are comprised of, for example, cylindrical glass containers and sampled blood is held, as a to-be-sampled material, in the blood sample tube 23. The blood sampled is sealed in the tube, by a stopper 24 (rubber stopper), under a near-vaccum atmosphere and, in such a condition, subjected to the action of a centrifuge, allowing the blood to be separated into blood clot 25, separator 26 and blood serum 27 as shown in FIG. 3. No centrifugal separation is necessary when "whole blood" is utilized.

The shape of the material holding container is not specifically restricted and use can be mode of a container, such as a vacuum blood sample tube and vial, for allowing a sealing stopper to be forced into the container through the elastic deformation of either one of the container mouth and sealing stopper. The interior of the container may be held at a proper negative pressure atmosphere or vaccum so as to keep a material storage state better or to achieve a positive sealing. The blood sample tubes are held by a holder 71 with their sealing stoppers 24 upright as indicated by the chain line in FIG. 2. The holder 71 is situated below the tube clamping unit 2 and can be moved by an elevator mechanism 72 made up of a plurality of rods. The blood sample tubes 23 held by the holder 71 are approachable to the clamping holder 5 from below and movable to a position between the opened clamps 6 and 7.

In this state, the clamps 6 and 7 driven by the clamp open/close motor 17 toward each other to enable the blood sample tubes 23 to be sandwiched therebetween. The opposed curved surfaces of the recesses 8 of the respective clamps 6, 7 are brought into contact with the outer peripheral surfaces of the blood sample tubes 23 so that the respective blood sample tubes are positioned by the recesses 8 of the clamps 6, 7. The respective blood sample tubes 23 are clamped by the clamps 6, 7 at those areas somewhat lower than the upper openings or mouths 23a.

When the slide members 12, 13 are driven to bring the clamps 6, 7 into clamping engagement with the blood sample tubes 23, the clamps 6, 7 are urged by the coil springs 14 so that the blood sample tubes 23 are positively clamped even if the curvature of the outer peripheral surface of the blood sample tube 23 is not necessarily conformed to that of the recesses 8 of the clamps 6, 7.

In the blood sample tube clamping unit 2, stops 28 are provided on the clamping body 16 side and, by so doing, one clamp 7 has its stroke regulated by the stops 28 so that no excessive clamping force acts on the clamps 6, 7.

Figure 5:
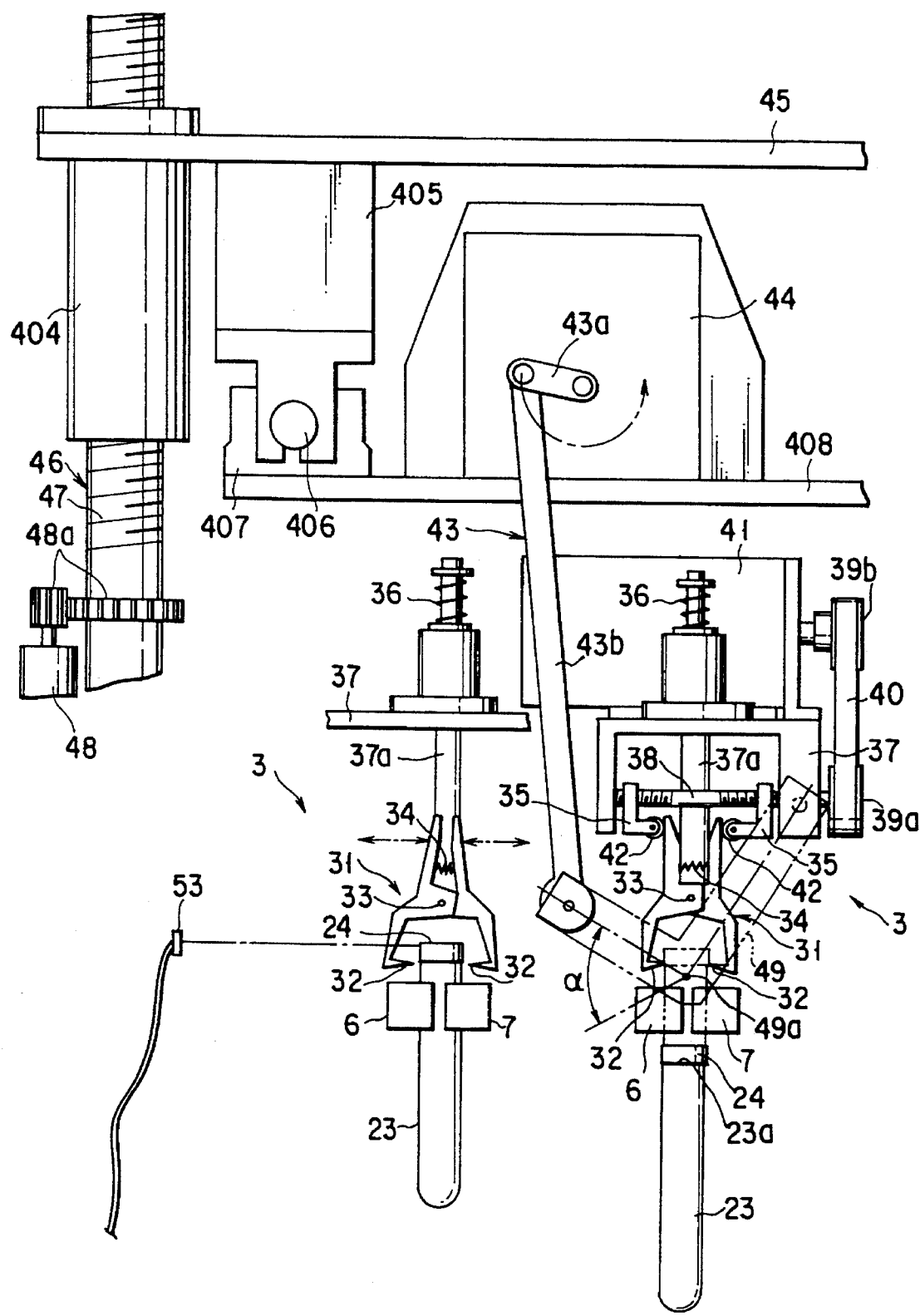
FIG. 5 is a diagrammatic view showing a stopper removing section in FIG. 1.

A plurality of pairs of chucking claw members 31 are provided on the stopper removing unit 3 as shown in FIG. 5, the chucking claw members acting in a pair. The chucking claw members 31 are of a "shears" type that they have sharp claws 32 at the forward ends and are pivotally displaced with a pivotal point as a common center. Further, the chucking claw members 31 are normally urged by a compression spring 34 toward each other, this urging direction being toward a closing direction.

When the blood sample tube 23 is to be chucked, the claw members 31 are forced to be opened by rollers 42 provided at the forward ends of a pair of push-in members to correspond to the respective chucking claw members 31. The chucking claw members 31 are mounted on a corresponding support member 37a elastically suspended on an open/close mechanism support 37 through a corresponding coil spring 36.

A pair of rotation shafts 38 (only one is shown) having two oppositely threaded portions are threaded into both the longitudinal end portions of the push-in member 35. The rotation shaft 38 is rotatably supported in the mechanism support 37 with a driven pulley 39a fitted at its one-end side. A timing belt 40 is run between the driven pulley 39 and an associated pulley 39b mounted on a chucking claw open/close motor 41.

The motor 41 rotates the rotation shafts 38 in the normal and reverse directions to cause the push-in members 35 to be freely moved toward and away from each other. The chucking claw members 31 are opened when the push-in members 35 are moved toward each other and closed when these members are moved away from each other. The roller 42 mounted on the forward end of the push-in member 35 abuts against the upper end portion of the chucking claw member 31 and rolls when the claw members 31 are opened and closed.

The open/close mechanism support 37 supports not only the claw members 31 but also the rotation shaft 38 and open/close motor 41. The open/close mechanism support 37 is coupled to the link mechanism 43 and the link mechanism 43 has, as shown in FIG. 5, a first link 43a connected at one end to a rotation type link motor 44 (swinging motion drive source) and a second link 43b connected at one end to the other end of the first link 43a. The link motor 44 is fixed to the up/down movable base 45. The link motor 44 is mounted on the upper surface of the horizontal moving base 408.

The guide shafts 46 have the threaded portions 47 and are threaded in the up/down movable base 45 at their threaded portions 47. The guide shaft 46 is rotated in the normal and reverse directions through a pair of gears 48a threadably movable with the operation of the up/down moving motor 48 serving as a linear drive source. This arrangement enables the up/down movable base 45 to be moved along the guide shaft 46. The up/down moving motor 48 is mounted on the device body 4.

The link mechanism 43 has an L-shaped first rotation plate 49 as indicated by the chain line in FIG. 5 The first rotation plate 49 is pivotally supported, on its partway, at the lower end portion of one support plate 50 suspended from the horizontal moving base 408 as shown in FIG. 1. Further, the first rotation plate 49 is fixed at one end to the open/close mechanism support 37 at one stopper removing unit 3 and pivoted at the other end to the other end of the second link 43b.

With one end of a second rotation plate 52 pivoted to the lower end portion of the other support plate 50, the other end of a connection rod 51 is coupled to the other end of the second rotation plate 52. The other-end side of the second rotation plate 52 is coupled to the open/close mechanism support 37 of the other stopper removing unit 37.

When the rotational force of the link motor 44 is transmitted by the link mechanism 43 to the first rotation plate 49, the first rotation plate 49 is rotated, at a predetermined angle, in a direction as indicated by an arrow S in FIG. 1. Further, the operation of the first rotation plate 49 is transmitted by the connection rod 51 to the rotation plate 52 so that the second rotation plate 52 is moved in interlock with the first rotation plate 49.

The first rotation plate 49 and second rotation plate 52 support the open/close mechanism support 37 and a drive force of the link motor 44 is transmitted to the open/close mechanism support 37. The first rotation plate 49 rotates the open/close mechanism support 37 of one stopper removing unit 3 and the second rotation plate 52 rotates the open/close mechanism support 37 of the other stopper removing unit 3. With the operations of the first and second rotation plates 49, 52, the claw members 31 supported on the open/close mechanism support 37 are rotated at a predetermined angle as indicated by a in FIG. 5.

By varying, for example, the length of the first link 43a and length of the other-end side of the first rotation plate 49, the angle a can be properly selected in accordance with the material, hardness, dimension, shape, etc., of the sealing stopper 24 and blood sample tube 23 from which the stopper is removed.

Here, the pivotal point 49a situated partway of the first rotation plate 49 is so set as to be located a predetermined amount (2 to 3 mm for example) below the claw members 31.

In the stopper removing device 1, a stopper removal detecting sensor 53 is provided at a high level substantially the same level at which the sealing stopper 24 of the blood sample tube 23 is situated. The stopper removal detection sensor 53 detects the sealing stopper 24 of the blood sample tube 23 in a predetermined position and is used in such a situation where a stopper removal failure occurs in the case where the presence of the sealing stopper 24 has been detected after the completion of the stopper removal operation.

The detection sensor 53 detects the presence or absence of the sealing stopper 24 of one blood sample tube 23 and a plurality of such detection sensors may be provided in a one-to-one corresponding relation to each blood sample tube 23.

The aforementioned various motors 17, 41, 44 and 48 are sequence-controlled by a drive signal from a controller 60 provided in the device body 4 as shown in FIGS. 1 and 2. A detection signal of the detection sensor 53 is input to controller 60.

The operation of the aforementioned stopper removing device 1 will be explained below in more detail.

When the horizontal movable base 408 is first positioned above the holder 71 with the blood sample tubes 23 held there, an operation start signal is input to the controller 60. The elevator mechanism 72 is operated to raise the holder 71 with the tubes 23 held there so that the top portions of the tubes 23 are inserted into the recesses 8 of the paired opened clamps 6, 7 in the clamp holder 5. Then the clamp open/close motor 17 is operated to drive the paired clamps 6, 7 toward each other. By so doing, the top portion of the tubes 23 are elastically held by the recesses 8 of the paired clamps and the holder 71 is lowered. That is, the tubes 23 are immovably held by the clamp holder 5 with their stopper-topped side set upright.

Then up/down moving motor 48 is operated, lowering the horizontal moving base 408 together with the up/down movable base 45 so that the claw members 31 reach the upper zone of the blood sample tubes 23 while being opened. When the claws 32, of the claw members reach a predetermined lower-side position of the sealing stopper 24, for example, a position 1 to 3 mm beneath the upper mouth 23a of the tube, the up/down movable base 45 is stopped and the claw open/close motor 41 is operated.

By so doing, the paired push-in members 35 are moved away from each other, thus releasing the spring 34 from being compressed. As shown in FIG. 6A, the chucking claw members 31 are closed and, under a restoring force of the spring 34, the upper portion of the tube 23 is elastically chucked or grasped by the claws of the claw members 31.

Then, the up/down movable base 45 is raised and hence the chucking claw members 31 are raised while sliding along the outer peripheral surface of the tube 23 when the claws 32, of the claw members 31, reach a boundary between the tube 23 and the sealing stopper 24, the claws 32, enter a stepped area between the tube 23 and the sealing stopper 24, that is, bite into the stepped area 24a of the sealing stopper 24.

At that time, the chucking claw members 31 are mounted on the support member 37a so held by the coil spring 36 as to be displaceable in an up/down direction. For this reason, the support member 37a can accommodate any change or difference in the height of the tube 23 through its displacement. That is, the claws 32 of the chucking claw members 31 can be positively penetrated into the sealing stopper 24.

The up/down movable base 45 is further raised and hence the chucking claw members 31, are raised upwardly with their claws 32 being bitten into the stepped area 24a of the sealing stopper 24 so that the sealing stopper 24 is pulled up. At the same time, the link motor 44 is operated to cause the claw members 31 to be swung through the link mechanism 43 as shown in FIGS. 6C and 6D. This imparts a force of withdrawal (out of the tube 23) and rightward/leftward twist force to the sealing stopper 24 at the same time. Upwardly convex arcuate foci are described at that time in alternately left/right directions. In this way, the sealing stopper 24 is gradually lifted from the upper mouth 23a of the tube 24.

At that time, the upward movement of the up/down movable base 45 may be made either in a continuous or in an intermittent fashion. Further, the lifting speed of the up/down movable base 45 and swing speed of the chucking claw members are properly controlled by a varying combination of the motors 41 and 44. As shown in FIG. 6D, an arcuate movement may be imparted to the stopper while describing an upwardly convex locus and, as the case may be, an alternate raising/swinging motion may be imparted to the stopper, while slowing down the lifting of the up/down movable base 45. By so doing, a swinging motion can be imparted to the stopper while describing a horizontally or downwardly convex arcuate locus.

The sealing stopper 24 is removed away from the tube 23 through the repeated swinging motion of the chucking claw members 31.

By gradually raising the sealing stopper 24, a clearance is created between the tube 23 and the stopper 24 to allow a pressure prevalent in the top space of the tube 23 to be gradually brought back to the atmospheric pressure so that the material sealed in the tube 23 is prevented from being scattered due to a sudden pressure change. Since, in particular, the stopper 24 is obliquely tilted under the arcuate swinging motion as set out above, tiny clearances effectively releasing a forced-in stopper from the tube are interruptedly created, thus improving the efficiency with which the stopper is removed out of the tube.

In the case where the stopper removal detection sensor 53 detects a stopper removal failure, a corresponding detection signal is input to the controller 60 and, in this case, the stopper removal operation alone is repeated a predetermined number of times. If such a stopper removal failure is not eliminated, an alarm signal is delivered from the controller 60.

The stopper removal operation is performed on a plurality of tubes 23 all at a time.

That is, the stopper removing device 1 can impart any up/down motion and swinging motion to the sealing stopper, while grasping the tube through the paired claw members 31. It is, therefore, possible to remove the stopper from the tube without requiring any manual operation.

After the stopper removal operation has been finished, the horizontal moving base 408 is moved in a direction as indicated by an arrow X in FIG. 2 to bring the stopper removing unit 3 to a position below which a through-away box 420 is located. The open/close motor 41 is operated to open the claw members 31. In this way, it is possible to throw away those stoppers chucked by the claw members 31 into the through-away box 420. That is, even after the stoppers 24 have been removed out of the tube 23, they are held by the claw members 31 without being dropped under their own weight out of the claw members 31. Since, therefore, the stoppers 24, being held by the chucking claw members 31, can be thrown away into the throw-away box 420 as indicated by a chain line FIG. 2, the operator can dispose of the stoppers 24 without manually touching them whereby it is possible to provide improved safety against any infection.

After the stoppers 24 have been disposed of, the horizontal moving base 408 is brought again back to the holder 71, being ready for the next operation cycle.

When the stopper removing operation has been finished, the holder 71 is raised or lifted by the elevator mechanism 72 and the opened tubes 23, being held by the tube clamping unit 2, are returned back to the holder 71. Then the holder 71 is replaced with a new holder 71 with stoppered blood sample tubes 23 held there, thus being in readiness for the next operation cycle. The aforementioned operation is repeated by the next operation start signal.

The holder 71 with the opened blood sample tubes 23 held there is transferred by a conveying mechanism, not shown, to a predetermined sample portion taking position where the holder is stopped. At this time, a nozzle, not shown, for taking up blood clot 25 or blood serum 27 descends from above selectively into one blood sample tube on the holder 71 and, taking up a predetermined amount of blood clot 25 or blood serum 27, transfers it into a predetermined container (not shown) for analysis. By so doing, a predetermined analysis is started.

In the aforementioned arrangement, since a swinging motion drive source (link motor 44) and up/down motion drive source (up/down motion motor 48) are provided independently, it is possible to positively withdraw the sealing stopper from the tube even under a small swing angle at which the swinging motion is imparted to the stopper. It is, therefore, possible to remove the stopper from the blood sample tube 23 without giving any excessively great swinging motion to the blood sample tube 23 at too great a swing angle. There is less chance that the blood sample tubes will be broken. It is thus possible to prevent any material contained in the tube from being scattered around due to the breakage of the tube. This results in improved stability against any inflection.

Since improved safety can be achieved against a possible infection, it is possible for those even having no analytical knowledge at all to remove the stopper from the tube.

Further, the chucking claw members 31 are elevated while having their claw tips elastically contacted with the tube 23. Even if, in this case, a stepped area of the stopper 24 is tiny relative to the tube 23 because the stepped area 24a of the sealing stopper is tiny, it is still possible to positively chuck or clamp the sealing stopper 24.

The tube 23 is chucked or grasped under a restoring force of the spring 34 and it is possible to facilitate the easiness with which a chucking or clamping force can be set and to prevent any excessive chucking force from acting upon the tube 23.

The claws 32 of the chucking claw members 31 make contact with the tube 23 from below the upper mouth 23a of the tube 23. When the claw members 31 are closed under an urging force of the spring 34, the claws 32 are not abutted against the upper mouth 23a of the tube 23, thereby preventing the upper mouth 23a of the tube 23 from being injured by any excessive force.

Further, the kinds of sealing stoppers 24 are determined through the utilization of the stopper removal detection sensor 54 and the swing angle, number of swinging motions, chucking force, etc., can be determined in accordance with the kind of sealing stoppers 24.

The present invention is not restricted to the aforementioned embodiment and various changes or modifications of the present invention can be made without departing from the spirit and scope of the present invention.

Although, in the embodiment for example, the claws 32 have been explained as a grasping means for making the claws 32 engaged with the stepped area 24a of the stopper 24, it is not always necessary, in the case where the material of the sealing stopper 24 is made of an elastic member, such as rubber or cork, to provide any stepped area to the stopper in which case it is possible to effectively grasp the stopper 24 by sharpening the claws 32 so as to enable the sharpened claws 32 to bite into the sealing stopper 24.

The stopper 24 can be grasped by the grasping means at a proper number of positions, not always restricted to two positions. That is, any proper swinging motion mechanism can be provided near the clamps 6, 7 to enable the tube to be temporarily clamped or unclamped and, at the same time, somewhat swung, for example, at a swing angle of 5° to 90°, preferably 30° to 90° so that the stopper can be grasped or clamped at proper places along its outer peripheral surface and a twist force can be imparted to the stopper in any proper direction.

When the stopper is to be twisted in any proper direction, it can be grasped or clamped by a shear type grasping means, that is, by three or four claw members 32 of the shear type grasping means in an equidistant relation. In this case, the support 37 can be coupled to any proper swinging mechanism, such as a rotation/swinging plate, so that the stopper, being grasped, can be swung in any proper direction. This structure is preferable for effective stopper removal operation.

The accompanying drawings, which are incorporated in and constitute a part of the specification, illustrate a presently preferred embodiment of the invention, and together with the general description given above and the detailed description of the preferred embodiment given below, serve to explain the principles of the invention.

What is claimed is:

1. A stopper removing device for removing a sealing stopper fitted in a material holding container, comprising:

a device body;

container holding means, provided on the device body, for immovably holding a material holding container in place;

a movable member, movable in an upward and a downward direction over the container holding means;

grasping means, swingably attached by a link mechanism to the movable member, for grasping a sealing stopper;

linear drive means for driving the movable member in the upward direction with the sealing stopper grasped by the grasping means, and for imparting a pull-up force to the sealing stopper; and swinging motion drive means for swinging the grasping means with the sealing stopper grasped by the grasping means and for imparting a twist force to the sealing stopper;

said grasping means comprising:

support members swingably attached by the link mechanism to the movable member;

a support mounted to the support members and which is elastically displaceable in the downward direction;

chucking claw members having claws at respective forward end portions thereof, said claws being engageable with the sealing stopper and said claw members being pivotable at respective intermediate positions thereof on lower end portions of the support members, the claws at the forward end portions of said chucking claw members being openable and closable;

urging means, provided on a back side of the chucking claw members, for elastically urging the chucking claw members in a direction in which the claws at the forward end portions of the chucking claw members are closed; and drive means, provided on the support, for driving the chucking claw members in a direction in which the claws at the forward end portions of the chucking claw members are opened against an urging force of the urging means.

2. The stopper removing device according to claim 1, wherein said container holding means comprises:

a pair of slide members movable toward and away from each other;

a pair of clamps elastically displaceable in a slide motion direction of the slide members; and drive means for driving the slide members toward or away from each other.

3. The stopper removing device according to claim 2, further comprising stopper means for restricting a driving of the pair of clamps toward each other.

4. The stopper removing device according to claim 2, wherein the pair of clamps are formed of an elastic material.

5. A stopper removing device according to claim 1, further comprising:

detecting means, located at a height level that is substantially the same as a height level at which the sealing stopper of the material holding container is situated, for detecting whether the sealing stopper is removed from the material holding container; and control means for repeatedly imparting the pull-up force and the twist force to the sealing stopper in response to a signal produced when the detecting means detects that the sealing stopper is not removed from the material holding container.

6. A stopper removing device for removing a sealing stopper fitted in a material holding container, comprising:

a device body;

container holding means, provided on the device body, for immovably holding a material holding container in place;

a movable member movable in an upward direction and a downward direction over the container holding means;

grasping means, swingably attached by a link mechanism to the movable member, for grasping the sealing stopper;

linear drive means for driving the movable member in the upward direction with the sealing stopper grasped by the grasping means, and for imparting a pull-up force to the sealing stopper; and swinging motion drive means for swinging the grasping means with the sealing stopper grasped by the grasping means and for imparting a twist force to the sealing stopper;

said movable member comprising:

a movable base provided on the device body, said movable base being movable in an up direction and a down direction and said movable base being driven by the linear drive means in an up and a down direction; and a horizontal moving base provided on a lower surface side of the movable base, the horizontal moving base being horizontally driven in a predetermined direction.

7. The stopper removing device according to claim 6, wherein said container holding means comprises:

a pair of slide members movable toward and away from each other;

a pair of clamps elastically displaceable in a slide motion direction of the slide members; and drive means for driving the slide members toward or away from each other.

8. The stopper removing device according to claim 7, further comprising stopper means for restricting a driving of the pair of clamps toward each other.

9. The stopper removing device according to claim 7, wherein the pair of clamps is formed of an elastic material.

10. A stopper removing device according to claim 6, further comprising:

detecting means, located at a height level that is substantially the same as a height level at which the sealing stopper of the material holding container is situated, for detecting whether the sealing stopper is removed from the material holding container; and control means for repeatedly imparting the pull-up force and the twist force to the sealing stopper in response to a signal produced when the detecting means detects that the sealing stopper is not removed from the material holding container.

11. A stopper removing device for removing a sealing stopper fitted in a material holding container, comprising:

a device body;

container holding means, provided on the device body, for immovably holding the material holding container in place;

a movable member movable in one of an upward and a downward direction over the container holding means;

grasping means, swingably attached by a link mechanism to the movable member, for grasping the sealing stopper;

linear drive means for driving the movable member in the upward direction with the sealing stopper grasped by the grasping means, and for imparting a pull-up force to the sealing stopper; and swinging motion drive means for swinging the grasping means with the sealing stopper grasped by the grasping means and for imparting a twist force to the sealing stopper;

said linear drive means comprising:

guide shaft means having a threaded portion and provided relative to the device body such that the guide shaft means is freely rotatable with an axis of the guide shaft means set in an up and down direction;

movable cylinder means engaged with the threaded portion of the guide shaft means and attached to the movable member; and a drive source for rotating the guide shaft means to allow the movable member to be driven in the up and down direction.

12. The stopper removing device according to claim 11, where said container holding means comprises:

a pair of slide members movable toward and away from each other;

a pair of clamps elastically displaceable in a slide motion direction of the slide members; and drive means for driving the slide members toward or away from each other.

13. The stopper removing device according to claim 12, further comprising stopper means for restricting a driving of the pair of clamps toward each other.

14. The stopper removing device according to claim 12, wherein the pair of clamps is formed of an elastic material.

15. A stopper removing device according to claim 11, further comprising:

detecting means, located at a height level that is substantially the same as a height level at which the sealing stopper of the material holding container is situated, for detecting whether the sealing stopper is removed from the material holding container; and control means for repeatedly imparting the pull-up force and the twist force to the sealing stopper in response to a signal produced when the detecting means detects that the sealing stopper is not removed from the material holding container.

* * * * *